United States Patent
Balasubramanian et al.

(10) Patent No.: US 7,072,072 B1
(45) Date of Patent: Jul. 4, 2006

(54) COLOR RENDERING OPTIMIZED FOR TEXT AND LINE ART

(75) Inventors: Thyagarajan Balasubramanian, Webster, NY (US); Reiner Eschbach, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/562,198

(22) Filed: May 2, 2000

(51) Int. Cl.
G06F 15/00 (2006.01)
G03F 3/08 (2006.01)
G06K 9/00 (2006.01)

(52) U.S. Cl. .................. 358/1.9; 358/520; 382/167
(58) Field of Classification Search ............. 358/511, 358/500, 3.14, 1.9, 1.18, 518, 529, 501; 382/167, 156, 251, 164, 132, 260, 274, 275; 355/38; 347/14

See application file for complete search history.

(56) References Cited

U.S. PATENT DOCUMENTS

| | | | | |
|---|---|---|---|---|
| 3,555,262 A * | 1/1971 | Shimada | ..................... | 358/529 |
| 3,647,295 A * | 3/1972 | Dobouney | .................... | 355/38 |
| 4,415,925 A * | 11/1983 | Tamura | ....................... | 358/511 |
| 4,926,248 A * | 5/1990 | Kobayashi et al. | .......... | 358/501 |
| 5,146,548 A * | 9/1992 | Bijnagte | .................... | 358/1.18 |
| 5,200,831 A * | 4/1993 | Tai | ............................. | 358/3.14 |
| 5,212,741 A * | 5/1993 | Barski et al. | ............... | 382/156 |
| 5,231,504 A * | 7/1993 | Magee | ........................ | 358/500 |
| 5,293,207 A * | 3/1994 | Haneda | ....................... | 358/500 |
| 5,481,372 A * | 1/1996 | Kouno et al. | ............ | 358/426.12 |
| 5,517,334 A * | 5/1996 | Morag et al. | ............... | 358/518 |
| 5,528,339 A * | 6/1996 | Buhr et al. | .................... | 355/32 |
| 5,539,540 A * | 7/1996 | Spaulding et al. | .......... | 358/518 |
| 5,592,311 A * | 1/1997 | Hibi | ........................... | 358/518 |
| 5,606,395 A * | 2/1997 | Yang et al. | ................... | 399/81 |
| 5,710,871 A * | 1/1998 | Tadenuma et al. | ........... | 358/1.9 |
| 5,742,410 A * | 4/1998 | Suzuki | ....................... | 358/518 |
| 5,768,403 A * | 6/1998 | Suzuki et al. | ................ | 358/2.1 |
| 5,881,209 A * | 3/1999 | Stokes | ....................... | 358/1.9 |
| 5,892,891 A * | 4/1999 | Dalal et al. | .................. | 358/1.9 |
| 5,943,059 A * | 8/1999 | Satoh et al. | ................. | 345/601 |
| 5,963,201 A * | 10/1999 | McGreggor et al. | ........ | 715/722 |
| 6,069,981 A * | 5/2000 | Murakami | ................... | 382/274 |
| 6,088,477 A * | 7/2000 | Ohta et al. | .................. | 382/167 |
| 6,118,896 A * | 9/2000 | Ohnuma | ..................... | 382/167 |
| 6,125,200 A * | 9/2000 | Warnock | ..................... | 382/164 |
| 6,249,596 B1 * | 6/2001 | Buytaert et al. | ............ | 382/132 |
| 6,275,302 B1 * | 8/2001 | Coleman | ..................... | 358/1.9 |
| 6,275,304 B1 * | 8/2001 | Eschbach et al. | ............ | 358/1.9 |
| 6,278,802 B1 * | 8/2001 | Delabastita et al. | ........ | 382/251 |
| 6,285,462 B1 * | 9/2001 | Balasubramanian et al. | . | 358/1.9 |
| 6,323,957 B1 * | 11/2001 | Ball | ............................ | 358/1.9 |

(Continued)

OTHER PUBLICATIONS

H. Boll, "A Color to Colorant Transformation for a Seven Ink Process", in Device Independent Color Imaging (Ed. E. Walowit), SPIE Proceedings, vol. 2170, pp. 108-118, 1994.*

(Continued)

Primary Examiner—Madeleine AV Nguyen
(74) Attorney, Agent, or Firm—Fay, Sharpe, Fagan, Minnich & McKee, LLP

(57) ABSTRACT

A pure rendering intent is used to render text and line art in color imaging systems. A CMY image goes through a one hundred percent under color removal process creating a CMYK image. The CMYK image is processed by a set of clamping tone reproduction curves. The clamping tone reproduction curves shift nearly saturated colors to total saturation. The result is a rendering of text and line art that has improved clarity and legibility.

19 Claims, 3 Drawing Sheets

U.S. PATENT DOCUMENTS

| | | | |
|---|---|---|---|
| 6,326,974 B1 * | 12/2001 | Satoh et al. | 345/581 |
| 6,345,128 B1 * | 2/2002 | Stokes | 382/254 |
| 6,346,993 B1 * | 2/2002 | Curry | 359/1.9 |
| 6,415,052 B1 * | 7/2002 | Ohsawa | 382/191 |
| 6,529,291 B1 * | 3/2003 | Schweid et al. | 358/1.9 |
| 6,574,004 B1 * | 6/2003 | Jacob et al. | 358/1.13 |
| 6,577,826 B1 * | 6/2003 | Misaizu et al. | 399/45 |
| 6,587,593 B1 * | 7/2003 | Matsuoka et al. | 382/260 |
| 6,646,762 B1 * | 11/2003 | Balasubramanian et al. | 358/1.9 |
| 6,648,442 B1 * | 11/2003 | Bauer | 347/14 |
| 6,693,942 B1 * | 2/2004 | Krupke | 372/75 |
| 2001/0031084 A1 * | 10/2001 | Cannata et al. | |
| 2001/0036231 A1 * | 11/2001 | Easwar et al. | 375/240.19 |
| 2002/0075491 A1 * | 6/2002 | Bares | |

OTHER PUBLICATIONS 1994-1998 International Color Consortium, Specification ICC.1:1998-09, "File Format For Color Profiles", Clause 4: Definitions, p. 11.

* cited by examiner

COLOR RENDERING OPTIMIZED FOR TEXT AND LINE ART

BACKGROUND OF THE INVENTION

1. Field of the Invention

The invention relates to the art of rendering electronic or digital images. The invention finds particular application in the rendering of text and line art images in color image reproduction systems.

2. Description of Related Art

Text and line art makeup an important class of printed and copied digital images. For example, this document, and the paperwork associated with it, is almost entirely made up of text and lines. The lines are used, for example, to separate sections of official forms.

Processing methods that would produce the most accurate and visually pleasing copies of text and line art are different than those used by most color image processing equipment. Existing transforms and image enhancement algorithms are optimized to produce accurate and pleasing spot color, business graphics, and photographic images.

Spot color applications require a high degree of color accuracy and purity. An example of a spot color application is the printing of a corporate logo. It is very important, when printing a corporate logo that colors be reproduced exactly, without any muddiness or colorant blending errors.

Business graphics applications include the printing of bar graphs and pie charts. In these applications, the user is less concerned about perfect color matching. Small differences, for example, between the colors in a graph as it was displayed on a computer screen (CRT) and as it is rendered by a printer are not very important. What is more important to the user is that the colors in the charts and graphs are crisp and uniform. Rendering methods or intents targeted for business graphics therefore, can and do make trade-offs. The goal of business graphics rendering intent is to produce vivid colors. To that end, perceived color matching and actual spectral content matching are sometimes sacrificed.

As the name implies, photographic applications include the reproduction of photographic scenes. The relationship between colors, and the sharpness of edges in a photographic image are usually considered more important than absolute color accuracy. Therefore, the photographic or perceptual intents make trade-offs that enhance color relationships and edge reproduction while sacrificing color accuracy.

An organization known as The International Color Consortium (ICC) has developed standards supporting color rendering intents called colorimetric, perceptual and saturation rendering intents. These rendering intents are best suited for rendering spot color, photographic images, and the pure hues of business graphics respectively. The ICC has not offered a rendering intent description optimized for text and line art.

Applying the available rendering intents to text and line art applications can produce undesirable results. For example, under certain circumstances, processing text and line art through the calorimetric, perceptual, or saturation intent can result in rendered images that contain distorting and displeasing halftone textures in the text or the background. One set of circumstances known to produce these results is the printing of small blue text on a gray background. The moiré patterns in the gray background combined with the halftone texture in the blue text results in reduced visibility and readability of the text. This quality reduction is unacceptable in most printing and copying applications.

Therefore there is a need for a processing method, or rendering intent, that is optimized for producing text and line art.

BRIEF SUMMARY OF THE INVENTION

Toward that end, a method for rendering color images, optimized for reproducing text and line art, has been developed. The method has been identified as the "Pure intent". The method comprises the steps of: accepting an image represented as a set of pixels, each pixel representing colors with a set of colorants, each pixel calling for a level of saturation for each colorant in the set of colorants, mapping pixels representing neutral and nearly neutral colors to pixels rendered with only a neutral colorant, and mapping pixels representing nearly pure primary colors to pixels representing pure primary colors.

Alternatively, the method comprises the steps of: accepting an image represented as a set of pixels, each pixel representing colors in a defined color space, each of the colors in that defined color space being transformable into a colorant space, each pixel calling for a level of saturation for each colorant in the set of colorants after transformation, mapping pixels representing neutral and nearly neutral colors to pixels rendered with only a neutral colorant, and mapping pixels representing nearly pure primary colors to pixels representing pure primary colors by modifying the pixel color in the defined color space or in the colorant space.

An advantage of the present invention is that it allows color image processing equipment to render clear legible copies of text and line art documents.

Another advantage of the present invention is that it renders text and line art without displeasing moiré patterns near neutral colors.

Another advantage of the present invention is that it renders text and line art without blending the text and line art into the background.

Another advantage of the present invention is that it removes colors that are some times added to, for example, black text, when the text is scanned with a noisy or miscalibrated scanner.

Another advantage of the present invention is that it reduces image production costs by reducing consumption of non-neutral colorants.

Another advantage of the present invention is that it produces cleaner sharper lines and text, reducing the amount of unwanted halftone texture.

Another advantage of the present invention is that it eliminates mis-registration artifacts in thin, neutral, text and lines.

BRIEF DESCRIPTION OF THE SEVERAL VIEWS OF THE DRAWINGS

The invention may take form in various components and arrangements of components, and in various steps and arrangements of steps. The drawings are only for purposes of illustrating preferred embodiments, they are not to scale, and are not to be construed as limiting the invention.

DETAILED DESCRIPTION OF THE INVENTION

The invention will be described with reference to the common RGB (Red, Green, Blue) and CMYK (Cyan, Magenta, Yellow, Black) color spaces. However it can be applied in other color spaces.

As is known, due to the workings of the human eye, red, green and blue (RGB) light can be additively mixed to produce the perception of other colors. Indeed, when combined in the correct proportions a mixture of red, green and blue light appears to the human eye, to be white. Additionally, it is known that the simple-subtractive mixing of cyan, magenta and yellow (CMY) colorants or pigments also produces the perception of other colors. The well-balanced mixing of these subtractive colorants is perceived by the human eye as black. Because of these effects, and for the purposes of this discussion, we refer to red, green, blue, cyan, magenta, yellow, along with black and white, as the primary colors.

Most text and line art is rendered in black (K). When text and/or line art is rendered in color, most often it is rendered in some other primary color. Armed with those facts and the knowledge that a particular image is a text and/or line art image, one can make two powerful assumptions about the image. One can assume that pixels in the image that describe nearly neutral colors are meant to describe purely neutral colors. One can also assume that pixels that describe nearly pure primary colors are meant to describe pure primary colors.

Figure 1:
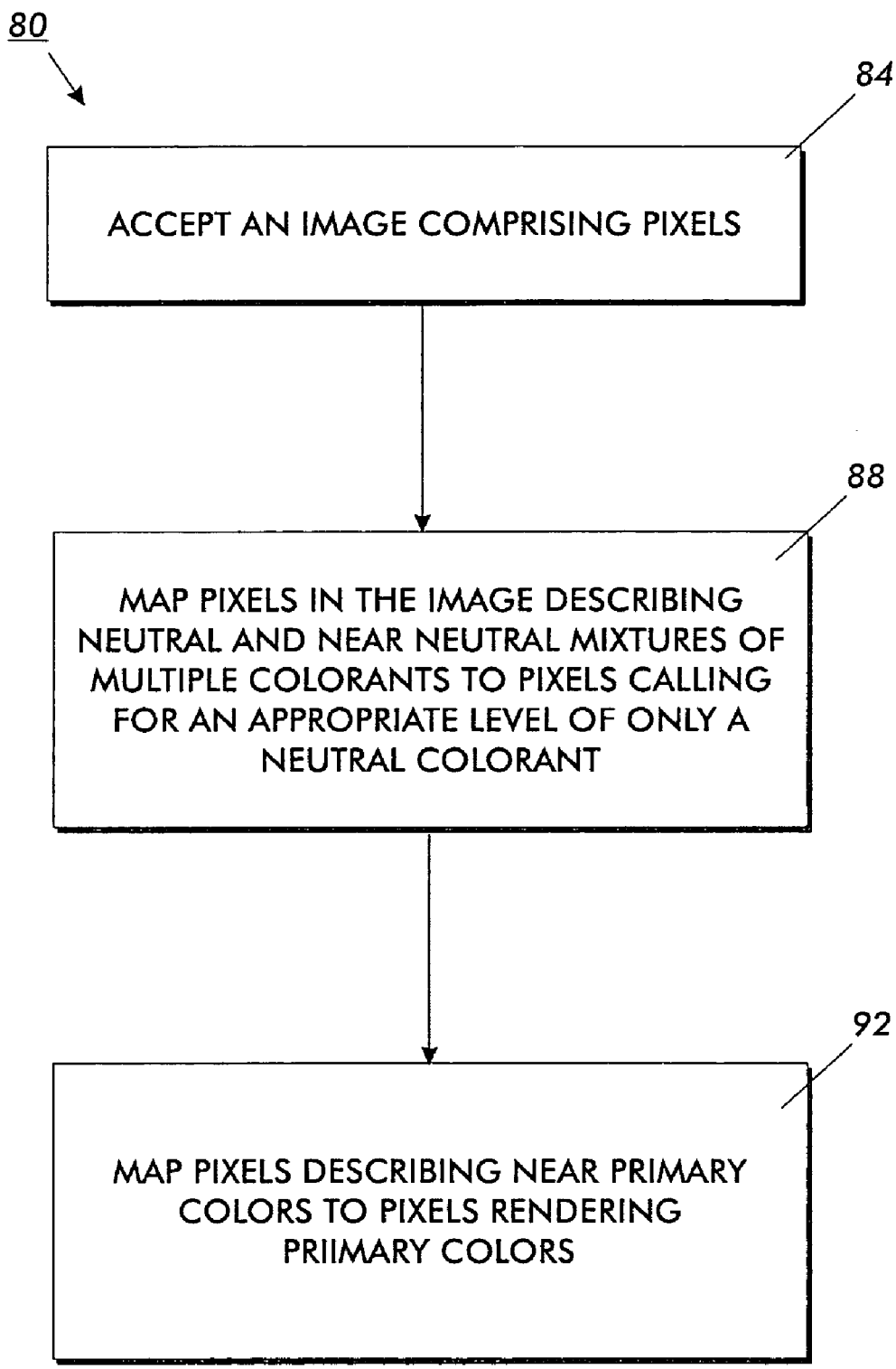
FIG. 1 is a flow chart illustrating steps in a method for rendering text and line art.

Referring to FIG. 1, realizing that those two assumptions are reasonable, has lead to the development of a better method for rendering a text and/or line art image with a color image processor. The method has been named the Pure Intent method 80. The first step in the method 80, as in all image-processing methods, is of course, an image input or acceptance step 84. An image is accepted from an image source (not shown). The list of possible image sources is quite vast. For example, possible image sources include word processing programs, desktop publishing programs, a computer network, such as the Internet, an image scanner, a computer's CPU or microprocessor, and computer files.

The next two steps can be performed in any order or can be performed simultaneously.

As illustrated, the next step is a neutral mapping step 88 that maps pixels that call for a neutral or near neutral combination of colorants, to pixels that call for an appropriate saturation level of only a neutral colorant. For example, when rendering an image with a printer that works in the CMYK color space, a pixel that calls for nearly equal amounts of the C (cyan), M (magenta) and Y (yellow) colorants is calling for a nearly neutral, or gray color. Such a pixel is mapped at this neutral mapping step 88, to a pixel calling for a corresponding amount of only a neutral colorant, for example a K (black) colorant.

Another step, and illustrated as the next step, is a primary mapping step 92. The primary mapping step 92 maps pixels that call for combinations of colorants that would yield nearly pure primary colors, to pixels that call for combinations of colorant that yield pure primary colors. For example, again, in the case of a CMYK printer, where a pixel calls for nearly equal amounts of the C colorant and the Y colorant and a much smaller amount of the M colorant, the pixel is calling for a nearly pure green. Such a pixel is mapped by this primary mapping step 92 to a pure green pixel. That is to say the initial pixel is mapped to a pixel calling for equal amounts of C and Y colorants and no M colorant.

The two mapping steps 88, 92 described above, performed in any order, improve the rendering of the vast majority of text and line art images.

Rendering neutral and near neutral colors with a single neutral colorant, for example with a pure K colorant in a CMYK printer, provides a cleaner rendering of text and lines. Furthermore, it helps to eliminate sensitivity to pile-height effects, moiré pattern generation, color mis-registration affects and changes in viewing illumination. Additionally, when text and line art documents are scanned, the scanning process can introduce some color into pixels that were originally neutral. Rendering neutrals and near neutrals as pure K eliminates this color noise, beneficially returning these pixels back to neutral.

Shifting colors that are close to the primaries to their nearest primary helps reduce the amount of halftoning present in text and therefore improves its legibility.

Figure 2:
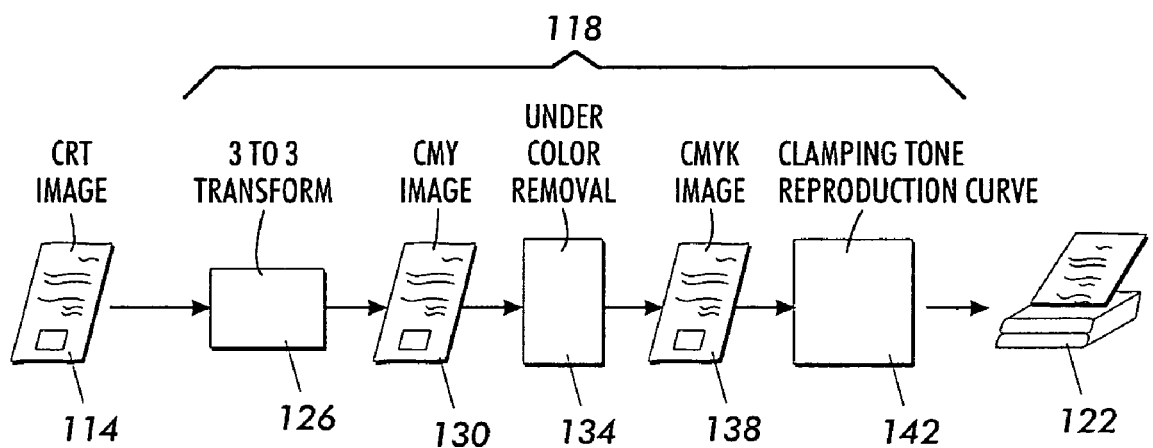
FIG. 2 is a block diagram of a pure intent image processing method.

Referring to FIG. 2, a CRT image 114, for example, a document created with a word processing program, and therefore originally viewed on a CRT, is processed through a pure intent algorithm 118 embodiment. In the illustrated embodiment the CRT image 114 is in RGB space and the rendering device 122 operates in CMYK space. Therefore, the CRT image 114 is processed by a three to three transform 126 that converts the CRT image 114 into a CMY space image 130. Typically the transform 126 involves gamma correction and hue rotation. Gama correction accounts for differences in tone reproductions of the CRT (not shown) and the rendering device 122. Hue rotation ensures the preservation of named colors. For example, hue rotation ensures that CRT blue maps to a similar and pleasing printer blue.

The CMY image 130 then goes through an one hundred percent under color removal process 134. The under color removal process ensures that neutral colors are rendered in pure K (pure black). The CMY image 130 is comprised of pixels. Each pixel calls for levels of saturation for each colorant in the CMY color space (Cyan, Magenta and Yellow). One hundred percent under color removal replaces the least saturated colorant in each pixel with an equivalent amount of K (Black). Additionally, the saturation levels of the remaining two colorants are also reduced.

There are a number of standard ways to perform one hundred percent under color removal. One way is to totally remove the colorant that has the lowest saturation level in a particular pixel and also reduced the saturation level of the other colorants by the same amount. The colorant removed in this process is then replaced with an appropriate amount of neutral colorant. Take for example a CMY pixel describing a near neutral color by calling for saturation levels of 35% cyan, 36% magenta and 37% yellow colorants. The one hundred percent under color removal process, described in the preceding paragraph, first determines that cyan has lowest saturation level and that the level is 35%. Therefore a level of 35% of black is introduced, and the saturation level of each of the pixels is reduced by 35 percent. This results in a pixel calling for saturation levels of 0% cyan, 1% magenta, 2% yellow, and 35% black.

Another one hundred percent under color removal method applies a nonlinear transformation, such as, for example, a power law (gamma) function to each of the colorant saturation levels in a pixel before subtracting away the colorant with the minimum saturation level and subtracting a like amount from the other colorants. This technique provides a convenient algorithm for performing 100% under color removal while maintaining the colorfulness of nearly pure primary colors.

Consider, for example, the transform equation:

Transformed Pixel Value=(Original Pixel Value)$^\gamma$

If one picks a value for gamma ($\gamma$) of 2 then the original pixel values are mapped to transformed pixel values by squaring. A CMY pixel with pixel values of cyan=10%, magenta=90% and yellow=90% represents a near primary color. In order to manipulate that pixel mathematically it is expressed in fractional form i.e. cyan=0.1, magenta=0.9 and yellow=0.9. If the pixel is processed through the transforming equation above with, for example, $\gamma$=2, the transformed pixel values become cyan=0.01, magenta=0.81, yellow=0.81. Performing under color replacement on the transformed version of the pixel yields pixels pixel values of cyan=0, magenta=0.80, yellow=0.80. Replacing the removed colorant with black yields a pixel in transformed pixel space with pixel values of cyan=0, magenta=0.80, yellow=0.80, black=0.01. A square root function is the inverse transform (raising the Transformed Pixel Values to the power of 1/$\gamma$) of the transform equation when $\gamma$=2. So processing the transform space pixel through the inverse transform yields a pixel with pixels values of cyan=0, magenta=0.8944, yellow=0.8944 and black=0.1. So, a near primary color pixel can be processed through the transform with only a small effect. The result for pixels calling for near neutral colors is quite different.

For example, a CMY pixel calling for cyan=0.45, magenta=0.5, yellow=0.5 is transformed to one calling for cyan=0.2025, magenta=0.25, yellow=0.25. Removing the under color and like amounts of the other colorants and adding like amounts of black yields a transform space pixel calling for cyan=0, magenta=0.0475, yellow=0.0475, black=0.2025. Applying the inverse transform yields a pixel calling for cyan=0, magenta=0.218, yellow=0.218, black=0.45. The magenta and yellow colorants have been reduced by more than half and the neutral colorant, black, now strongly dominates the pixel.

When gamma law functions are used in under color removal, the values of $\gamma$ typically used range from 1 to 3. However, other values may be used, depending on the desired result.

Whichever method is used, the one hundred percent under color removal process 134 converts the CMY image to a CMYK color space image 138. The one hundred percent under color removal process 134 also performs a great deal of the neutral mapping step 88 described in reference to FIG. 1.

Figure 3:
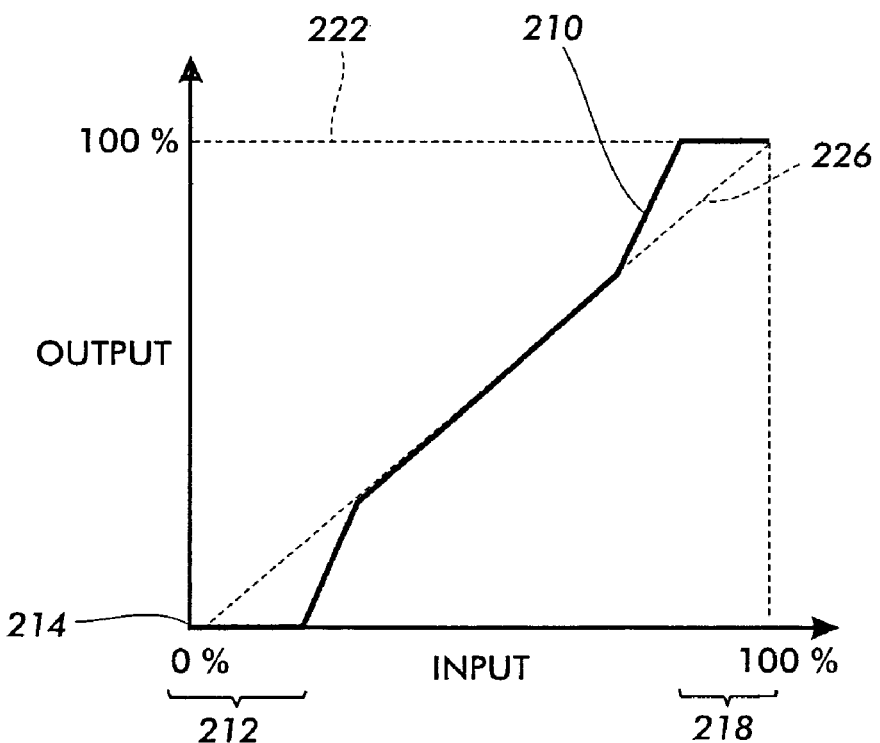
FIG. 3 is a graph illustrating the function of clamping and identity type tone reproduction curves.

Next, the CMYK image 138 is processed through a clamping tone reproduction curve set 142. Referring to FIG. 3, in the illustrated embodiment the set 142 contains a clamping tone reproduction curve 210 that is generated for each colorant channel, for example (CMYK). Input colorant saturation levels near zero 212 result in output colorant saturation levels of zero 214. Input colorant saturation levels near 100% saturation 218 result in 100% output colorant saturation levels 222. Where the under color removal process 134 results in a pixel with a significant K component and small amounts of C, M and Y components, the illustrated tone reproduction curves clamp the C, M and Y components to zero, and hence, near-neutral colors are rendered with only the K component. Thus it is ensured that the vast majority of neutral and approximately neutral text and line art is rendered in pure black. For example, a pixel calling for colorant saturation levels 0% cyan, 1% magenta, 2% yellow and 35% black is mapped by clamping type tone reproduction curves 210 to a new pixel calling for 0% cyan, 0% magenta 0% yellow and 35% black. The small amounts of magenta and yellow colorant in the original CMYK pixel could have contributed to color fringes on the edges of a line or text element of which the pixel was a part. The new pixel does not include those colorants and so the text or line that it is part of will appear crisper and sharper.

One alternative to the embodiment described above is to use an identity tone reproduction curve 226 for the K colorant alone. An identity K colorant tone reproduction curve is desirable where text and lines are rendered in, for example, light gray. Using a clamping K channel tone reproduction curve 210 described above could force light gray text all the way to white. Moving light gray text to white would cause the light gray text to disappear. Using the identity K colorant tone reproduction curve 226 preserves light gray text and lines.

Whether the tone reproduction curves used are all clamping type tone reproductions curves 210 or include a identity type tone reproductions curve 226 for the K channel, processing an image through the tone reproduction curves finishes the neutral mapping step 88 described in reference to FIG. 1. Additionally, processing the image through clamping type tone reproductions curves 210 is one way to perform the primary mapping function 92.

For example, using clamping tone reproduction curves for all the colorants, a nearly pure primary pixel which would be rendered by a standard rendering intent with colorant saturation levels of 95% cyan, 7% magenta, 93% yellow and 10% black, would instead be mapped to a pixel calling for 100% cyan, 0% magenta 100% yellow and 0% black. The resulting pixel would be perceived as green, one of the pure primaries. Note how the small amounts of magenta and black, which are likely to produce undesirable halftone textures, are now eliminated.

Figure 4:
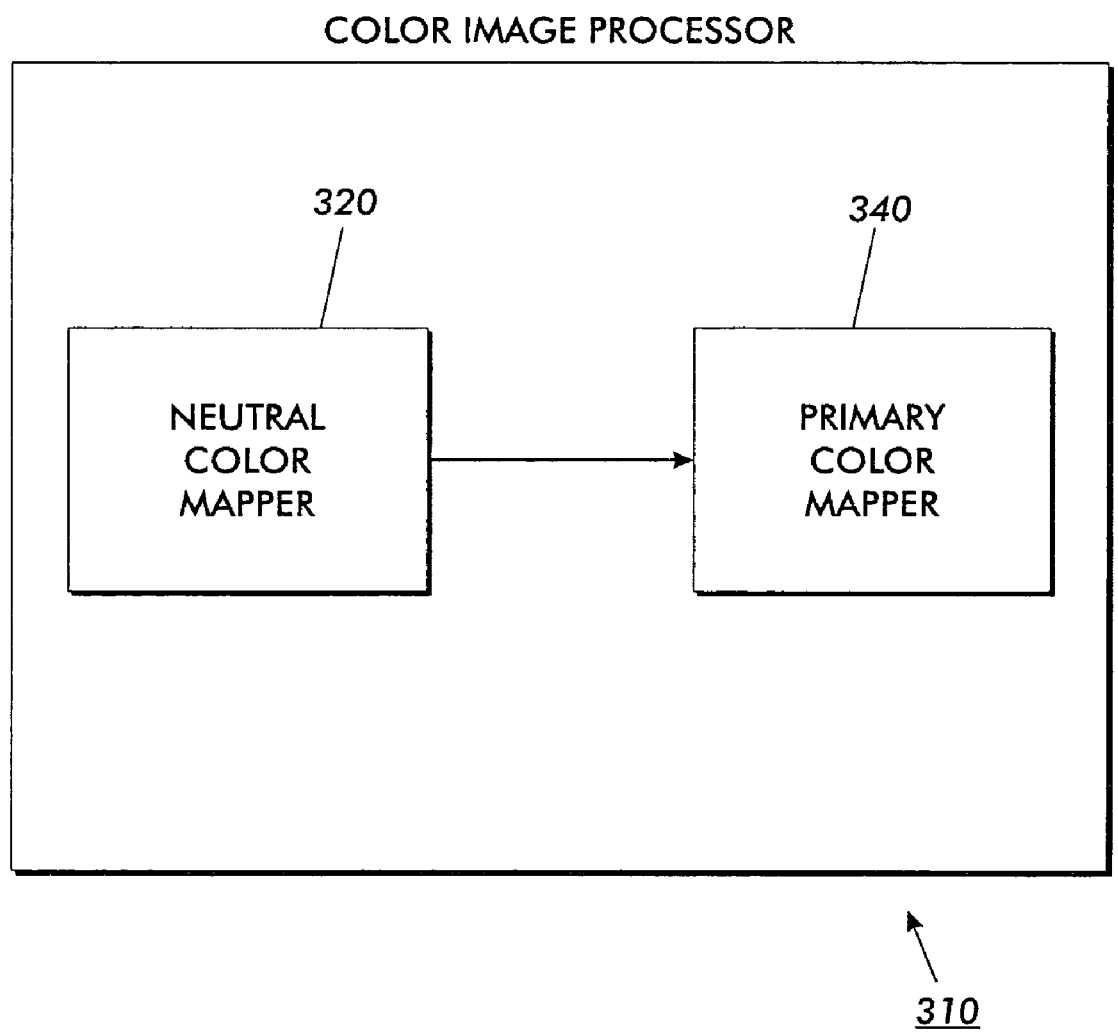
FIG. 4 is a block diagram of a color image processing device including components for performing a method of rendering text and line art.

Referring now to FIG. 4, a color image processor 310 for processing text and line art images includes a neutral color mapper 320 and a primary color mapper 340. The neutral color mapper 320 maps pixels that call for neutral and nearly neutral combinations of colorants to pixels that are rendered with only a neutral colorant. The primary color mapper 340 maps pixels that represent colorant combinations that represent nearly pure primary colors to pixels representing corresponding pure primary colors.

Of course, the neutral mapper 320 and primary mapper 340 can share components and indeed can comprise functional modules that perform both tasks or portions of both tasks simultaneously. For example the neutral mapper and primary mapper can comprise a one hundred percent under color remover and a set of tone reproduction curves that work together to perform both the neutral mapping and primary color mapping task.

Typically, the neutral mapper 320 and primary mapper 340 are implemented as software modules. The mappers are stored in computer or microprocessor memory and executed by a microprocessor or central processing unit. However the functions of the neutral mapper 320 and primary mapper 340 can be carried out in various ways and by various devices, including but not limited to distributed processors and various components interconnected via computer networks.

The invention has been described with reference to particular embodiments. Modifications and alterations will occur to others upon reading and understanding this specification. For example different clamping tone reproduction curves can be used than those illustrated. Clamping can begin further from or closer to the end points of the curve. Moving the points where clamping begins simply redefines the meaning of the phrases "nearly neutral" and "nearly pure". The meaning of those phrases is meant to be adjusted based on the idiosyncrasies of the equipment involved and the application to which the method and equipment are applied. While sets of one dimensional tone reproductions curves were described, it is anticipated that multidimensional techniques can be used to implement the neutral mapper and primary mapper functions. It is intended that all such modifications and alterations are included insofar as they come within the scope of the appended claims or equivalents thereof.

What is claimed is:

1. A method for rendering an image, comprising:
   accepting an image represented as a set of pixels, each pixel representing colors with a set of colorants, each pixel calling for a level of saturation for each colorant in the set of colorants;
   mapping pixels representing neutral and nearly neutral colors to pixels rendered with only a neutral colorant; and
   mapping pixels representing nearly pure primary colors to pixels representing pure primary colors, whereby text and line art is rendered more clearly, for limiting displeasing moiré patterns and halftone registration errors.

2. The method for rendering an image of claim 1 wherein mapping pixels further comprise:
   selecting a colorant to be removed from each pixel;
   removing 100% of the selected colorant and replacing the selected colorant with an equivalent amount of the neutral colorant; and
   reducing the level of the remaining colorants to create an intermediate image.

3. The method for rendering an image of claim 2 wherein mapping pixels further comprise:
   generating a neutral colorant tone reproduction curve for the neutral colorant;
   generating a remaining colorant tone reproduction curve for each remaining colorant;
   processing the neutral colorant in each pixel in the intermediate image through the neutral colorant tone reproduction curve; and
   processing each remaining colorant in each pixel in the intermediate image through each remaining colorants' remaining colorant tone reproduction curve.

4. The method for rendering an image of claim 3 wherein generating a neutral colorant tone reproduction curve further comprises:
   generating a clamping type neutral colorant tone reproduction curve.

5. The method for rendering an image of claim 3 wherein generating a neutral colorant tone reproduction curve further comprises:
   generating an identity type neutral colorant tone reproduction curve.

6. The method for rendering an image of claim 3 wherein generating a remaining colorant tone reproduction curve further comprises:
   generating a clamping type remaining colorant tone reproduction curve.

7. The method for rendering an image of claim 2 wherein selecting a colorant further comprises:
   determining which colorant has a lowest saturation level, and
   selecting the colorant with the lowest saturation level.

8. The method for rendering an image of claim 2 further comprising:
   transforming each pixel through a non-linear transform, from an original color space into a non-linear transform space, and
   inversely transforming each pixel for returning each pixel to the original color space.

9. The method for rendering an image of claim 8 wherein transforming each pixel further comprises:
   transforming each pixel through a power law function.

10. The method for rendering an image of claim 1 wherein accepting an image further comprises:
    accepting an image represented as a set of pixels, each pixel representing colors described with a set of colorants comprising cyan, magenta, and yellow.

11. The method for rendering an image of claim 1 wherein accepting an image further comprises:
    accepting an image represented as a set of pixels, each pixel representing colors described with a set of colorants comprising red, green, and blue.

12. The method for rendering an image of claim 11 further comprising:
    translating the pixels representing colors described with the set of colorants comprising red, green and blue, to pixels representing colors described with the set of colorants comprising cyan, magenta, and yellow.

13. The method for rendering an image of claim 1 wherein mapping pixels representing neutral and nearly neutral colors further comprises:
    mapping pixels representing nearly neutral colors to pixels rendered with only a black colorant.

14. A color image rendering device comprising:
    a neutral color mapper configured to map pixels of an image representing neutral and nearly neutral mixtures of colorants to pixels rendered with only a neutral colorant, and
    a primary color mapper configured to map pixels of the image representing nearly pure primary colors to pixels representing corresponding pure primary color, whereby text and line art is rendered more clearly for limiting displeasing moiré patterns and/or halftone registration errors.

15. The color image rendering device of claim 14 wherein the neutral color mapper and the primary color mapper further comprise:
    a one hundred percent under color remover, and
    a set of tone reproduction curves.

16. The color image rendering device of claim 15 wherein the set of tone reproduction curves further comprises:
    a neutral colorant tone reproduction curve, and
    a set of remaining colorant reproduction curves.

17. The color image rendering device of claim 16 wherein the set of remaining colorant tone reproduction curves further comprises:
    clamping type tone reproduction curves.

18. The color image rendering device of claim 16 wherein the neutral colorant tone reproduction curve further comprises:
    an identity type tone reproduction curve.

19. The color image rendering device of claim 16 wherein the neutral colorant tone reproduction curve further comprises:
    a clamping type tone reproduction curve.

* * * * *